(12) United States Patent
Garcia et al.

(10) Patent No.: US 8,794,555 B2
(45) Date of Patent: Aug. 5, 2014

(54) VEGETABLE CUTTING MACHINE

(75) Inventors: Javier Hidalgo Garcia, Tolosa (ES); Aitor Aguirrezabalaga Zubizarreta, Azpeitia (ES)

(73) Assignee: Sammic, S.L., Guipuzcoa (ES)

(*) Notice: Subject to any disclaimer, the term of this patent is extended or adjusted under 35 U.S.C. 154(b) by 240 days.

(21) Appl. No.: 13/359,148

(22) Filed: Jan. 26, 2012

(65) Prior Publication Data

US 2012/0211577 A1  Aug. 23, 2012

(30) Foreign Application Priority Data

Jan. 27, 2011  (ES) .................................. 201100071

(51) Int. Cl.
*B02C 17/02* (2006.01)
*B02C 18/12* (2006.01)

(52) U.S. Cl.
USPC ......................................... 241/92; 241/278.1

(58) Field of Classification Search
USPC ............ 241/91, 92, 37.5, 278.1, 282.1, 282.2
See application file for complete search history.

(56) References Cited

U.S. PATENT DOCUMENTS

| | | | | | |
|---|---|---|---|---|---|
| 4,127,236 | A | * | 11/1978 | Lasar | 241/37.5 |
| 4,216,917 | A | * | 8/1980 | Clare et al. | 241/37.5 |
| 4,226,373 | A | * | 10/1980 | Williams | 241/37.5 |
| 4,614,306 | A | * | 9/1986 | Doggett | 241/37.5 |
| 4,819,882 | A | * | 4/1989 | Stottmann et al. | 241/92 |
| 4,821,968 | A | * | 4/1989 | Fleche | 241/37.5 |
| 4,824,029 | A | * | 4/1989 | Stottmann et al. | 241/37.5 |
| 5,037,033 | A | * | 8/1991 | Stottmann et al. | 241/37.5 |
| 6,669,124 | B2 | * | 12/2003 | Lazzer et al. | 241/36 |
| 7,028,930 | B2 | * | 4/2006 | Carnevale | 241/37.5 |
| 7,252,252 | B2 | * | 8/2007 | Mauch et al. | 241/92 |
| 7,530,510 | B2 | * | 5/2009 | Newman et al. | 241/92 |

* cited by examiner

*Primary Examiner* — Faye Francis

(74) *Attorney, Agent, or Firm* — Donald J. Ranft; Collen IP

(57) ABSTRACT

The machine disclosed herein is a vegetable cutting machine. It includes a base that houses a motor which activates the drive shaft of the cutting disks; a cover that closes off the base and that houses a cutting disk; a food feeder part joined to the cover in a way that allows dismounting; a food feeder mouth; and a curvilinear presser with a cylindrical tube projecting therefrom which is housed inside the feeder mouth. The presser is dismountable as a result of removable shaft. The presser has a turning handle at the end opposite the folding end thereof. The machine also includes a blocking device between the food feeder and the cover. The machine further incorporates a single support for the motor and all of the driving and motion transmission components. Lastly, the presser incorporates a safety lever which activates the power supply switch of the motor.

13 Claims, 11 Drawing Sheets

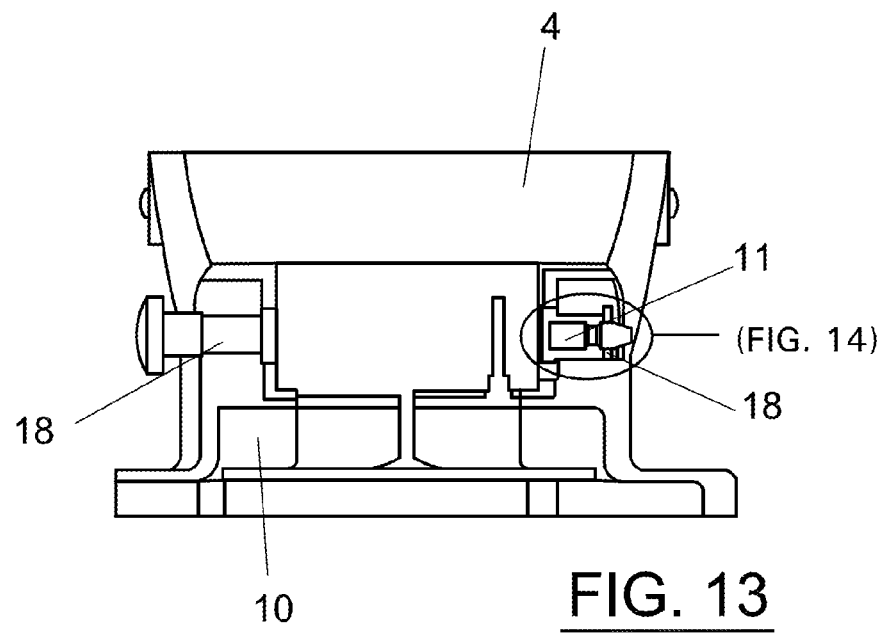
FIG. 13
FIG. 14
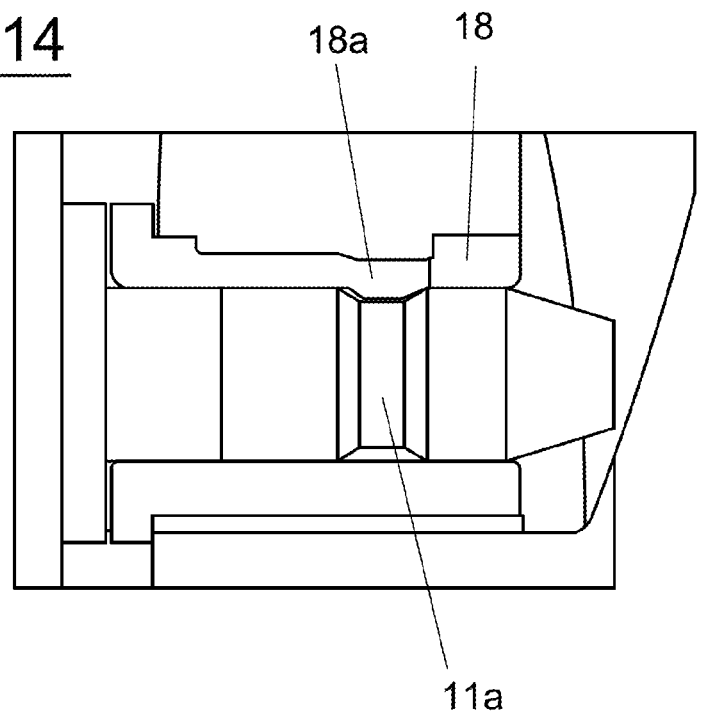

VEGETABLE CUTTING MACHINE

FIELD OF THE INVENTION

The field of application of the invention is within the industrial sector dedicated to the manufacture and/or installation of kitchen equipment, such as food slicers, food processors, etc.

BACKGROUND

Various types and models of machines used for functions such as cutting vegetables and other products are known, which find their main application in industrial kitchens and places that process large quantities and volumes of food. These machines considerably facilitate users' jobs since they save a lot of work and effort, as well as time, for the persons responsible for these tasks.

As is known, a vegetable cutting machine of the type used in the state of the art, normally consists of several distinct components or parts, which can be coupled together to assemble the machine. These components essentially consist of a base that contains the motor unit, a cover that closes off the base at its top and that contributes to the formation of a cavity through which a shaft emerges driven by the motor and which houses the cutting tools used by the machine, and a part constituting the food feeder, superimposed on the cover of the base, and provided with a conduit for feeding the food in the direction of the cutting tool. The assembly is complemented with a presser piece, articulated in a manner that folds at one of its ends, and provided with means for holding on the side opposite to the folding end. Projecting from the presser piece is a tubular element that is inserted through the food feeder conduit and through the tubular element of which a piece or component that is normally known as a plunger can be likewise similarly introduced. The plunger is designed to press the food in a downwards direction towards the cutting tool, and is normally provided with some form of stopper that limits the plunger's path through the tubular conduit.

A machine of this type perfectly fulfils the objective of cutting vegetables and other products, for which it was designed. However, despite fulfilling its objective, there are several aspects of the design that can be improved with a view to making it more ergonomic, easier and safer to handle, longer-lasting, and especially easier to maintain, guaranteeing that cleaning operations can be achieved in a more complete manner. This is the purpose for which the present invention has been developed, the objectives of which have been fully achieved by means of the improvements resulting from the structural and functional changes introduced in this type of machine, and which are explained below.

SUMMARY

The machine disclosed relates to a vegetable cutting machine, which provides novel features and notable advantages in respect of known means used for the same purposes in the current state of the art.

The machine disclosed is designed to cut vegetables. It is similarly designed for the cutting and processing of other products such as cheeses, bread, etc., and for different configurations such as slices of different thicknesses, dice and sticks, fine strips, thick strips, and grated pieces. The device is designed for continuous use in kitchens and provides a set of constructive and functional improvements compared to machines currently known and used for the same purposes, including greater operational comfort and above all greater functional safety for the user. Additionally, the machine disclosed is designed to be disassembled, thereby facilitating complete cleaning thereof.

The applicant and other manufacturers have distributed for many years, several models of machines with their own design, having the same main function as that performed by the machine disclosed herein. However, the applicant's continuous research has allowed it to achieve considerable improvements in respect to various functional parts of known machines, which not only allow improved handling by the user, but also affect functional characteristics thereof. This results in easier and more complete maintenance operations, especially from the point of view of better cleaning of the machine.

This machine disclosed includes a new presser device with a configuration that presents a curvilinear outline in such a way that its holding end is situated at a height corresponding to a comfortable position for the person using the machine. The holding end incorporates a turning handle that follows the user's hand irrespective of the position that it occupies during handling of the presser, thus making the operations more convenient for the user. The presser of the invention presents the particular feature that the hinging means consist of a dismountable, removable shaft, in such a way that the presser can be removed whenever convenient and thoroughly cleaned. The holding handle of the presser has a through-hole on the longitudinal axis through which a shaft can be inserted and fixed into position by nuts at either end. Thus rotation of the handle follows the user's wrist without abrupt changes.

The machine disclosed also includes a food feeder which is removable. There is a suspended connection between the food feeder part and the base cover, which is comprised of a hinge shaft that passes through the axial orifices made in the opposite turning supports that overhang in a correspondingly complementary manner from the adjacent longitudinal edges of both the food feeder and base cover.

It has also been contemplated that the interlock between the food feeder and the cover can be achieved with greater safety and ease. The incorporation of a blocking device is thus included consisting of a lock piece associated to the food feeder, which rotates with respect to a fastening screw. The lock piece is made with a hook at one end which allows for coupling to a shaft or pin overhanging from the cover piece. The lock piece is also provided with a widened portion on the end opposite to the hook to facilitate pushing by the user. The lock piece can be fixed in two positions due to the partial housing of a spring-loaded ball in a housing located in the support for the lock piece, and two approximately semi-spherical cavities made on the internal face of the lock piece itself. With this, the user can choose the closed or open position by placing the lock piece in one position or the other.

In the machine disclosed the food feeder mouth is modified to ensure that the food remains on the operative area of the cutting tool. This prevents food from dropping onto the middle of the cutting disk, on which adequate cutting of the food cannot be guaranteed. In order to achieve this objective, the profile of the food feeder mouth is designed such that it presents a projecting area, of an approximately semi-cylindrical shape, and located in a position corresponding to the location of the turning axis, which it materially envelops. In this way, access of the food to an inappropriate zone is prevented, and it is ensured that all slices cut by the tool have a uniform thickness.

The plunger device is designed such that it meets the normal requirements for this type of device. First it must be comfortable to use, and the securing means normally incorporated by the fastener are embodied in such a way that they do not represent an obstacle or impediment for the user. Second it must be capable of being rigidly secured to the cylindrical conduit of the presser, such that it cannot move or come out while the machine is in use. In order to fulfill both requirements, the design of the plunger includes a circumferential tab projecting over the perimeter at a predetermined height. The shape and size of the tab is such that it may be easily inserted into a fastener which is sized to accommodate said tab and secure the position of the plunger. This facilitates the user to easily use the plunger to press the vegetable inside, until it is fully cut.

An additional improvement is made to the machine's motor support. In existing machines, the transmission between the motor of the machine and the drive shaft that turns the cutting tool is achieved by means of a belt that transfers the turning motion to a pulley connected to the shaft of the cutting tool. The assembly consisting of the bearings, catch, pulley and drive shaft are mounted in the cover that closes off the base of the machine at its top. This construction has the disadvantage that the mounting of the components is complicated and requires a considerable amount of work and time. In order to resolve this disadvantage, all the motion transmission components, including the drive shaft, are mounted on the same support as the motor. The entire assembly is coupled to the cover which includes a catch that prevents the entrance of water into the machine's internal components. The shaft is guided through a hole in the cover to its central position by ferrules which at one end are inserted by pressure into cylindrical housings in the cover and at the opposite end are inserted into holes in the motor support itself. The inclusion of all motion generation and transmission components, including the drive shaft itself, into the same motor support, also provides the advantage that, with a suitable choice of transmission belt, the inclusion of a tensioner is not necessary. This provides savings in terms of space and manufacturing costs.

As will be understood, this vegetable cutting machine consists of essentially the same components as existing machines. But unlike existing machines, the fundamental parts thereof have been modified structurally/functionally, resolving disadvantages observed in current machines, thus offering considerable advantages compared to the latter. Of course, the machine according to the invention incorporates known safety elements which are considered appropriate to prevent the functioning thereof in unsafe conditions including when any part thereof is open and its potential activation could represent a potential danger for the user.

BRIEF DESCRIPTION OF THE DRAWINGS

These and other characteristics and benefits of the invention shall become clearer following the detailed description below of an example of a preferred embodiment thereof, provided solely by way of illustration and not limitation, with reference to the attached drawings, wherein:

FIGS. 11, 12, 13 and 14 are partial views, in perspective, illustrating structural details related to the removable nature of the presser.

DESCRIPTION OF A PREFERRED EMBODIMENT

Figure 1:
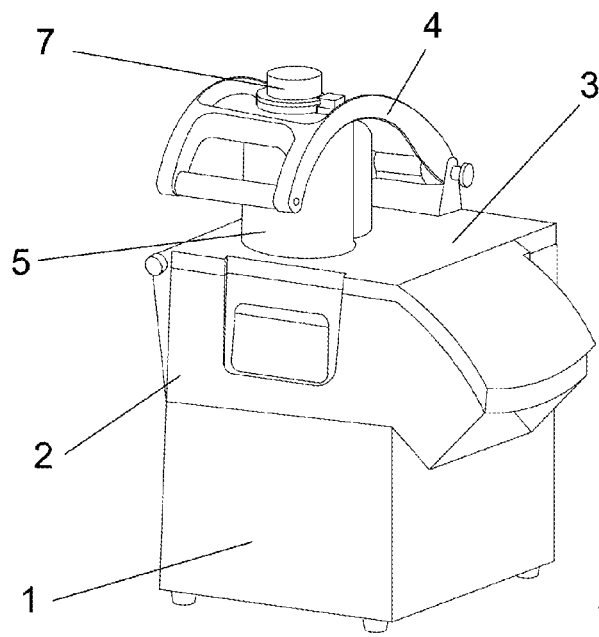
FIG. 1 is a schematic representation, in perspective, of a vegetable cutting machine as disclosed herein.

The detailed description of the improved vegetable cutting machine is disclosed hereafter with the help of the attached drawings which identify the numerical references used to designate parts. FIG. 1 illustrates in perspective, a food cutting machine wherein the set of improvements referred to above has been incorporated, and by means of which it is possible to increase the operating and general maintenance possibilities of the machine. The machine includes the traditional design of other machines already in existence, in that it consists of a base 1 which on its top part is closed by means of a cover 2 on which a food feeder 3 is mounted with a presser 4 connected in a manner which allows it to be folded back at one of its ends. The food feeder 3 includes a mouth 5 which emerges orthogonally from the surface of the outer face thereof, and extends into the machine to above the cutting disk (not visible in the drawing). A cylindrical tube 6 is attached to the food presser and when in operation it is housed inside the mouth 5 as can be seen in FIG. 3. This cylindrical tube 6 in turn admits the insertion through it, of a plunging device 7, (FIGS. 1, 3 and 4) which enables the user to press the foods introduced through the aforesaid cylindrical tube 6 against the internal cutting disk 8 (FIG. 2), until the food has been completely cut.

Figure 2:
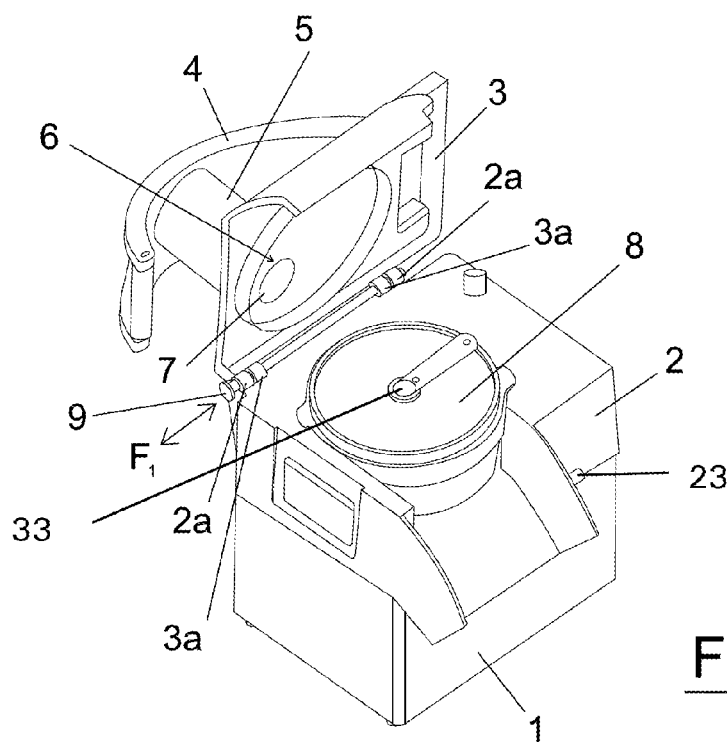
FIG. 2 is a schematic illustration, also in perspective, of the machine of FIG. 1 in the open state with the food feeder part folded back.
Figure 3:
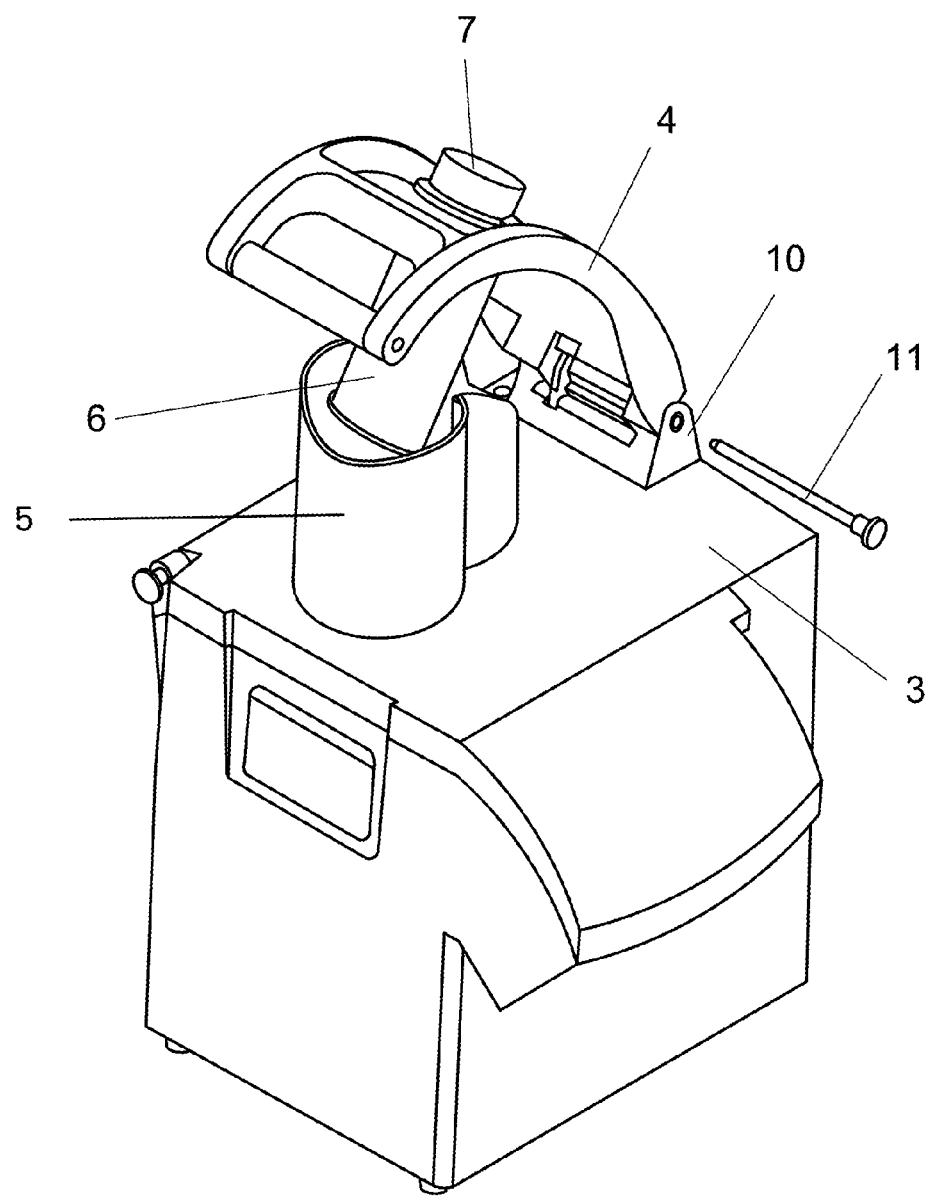
FIG. 3 is a schematic view, in perspective, that illustrates the removable feature of the presser.

FIG. 2 shows a schematic view, in perspective, of the same machine of FIG. 1, with the food feeder 3 in the lifted position with respect to one of its longitudinal edges, leaving the inside of the machine uncovered. The food feeder 3 is attached to the cover 2 by means of a removable shaft/pin 9 which is inserted through a pair of turning supports 3a on the food feeder 3 and a pair of turning supports 2a on the cover 2. Removal of the pin 9 allows separation of the food feeder 3 from the cover 2. The securing of the shaft 9 may be achieved through any conventional means, such as a threaded portion, a nut coupled to the opposite end to that of insertion, or any other known configuration. FIG. 2 also shows the location of the cutting disk 8 as is conventional in this type of machine for cutting vegetables and other products. The cutting disk 8 is located below the bottom end of the cylindrical tube 6 and the mouth 5, within which the plunger 7 is pushed down to press the food against the aforesaid cutting disk 8.

The presser 4 has been given a curvilinear shape along its longitudinal axis such that the end held by the user is situated at a comfortable height and location for the user. The pivoting end of the presser 4 is connected to a machine support 10 that is integrated with the food feeder part 3. The provision of holes in opposite positions on both the support 10 as well as the respective ends of the presser 4, allow a removable shaft 11 to be inserted to connect the presser 4 to the food feeder 3. The pivoting shaft 11 of the presser 4 is secured in place with the help of ferrules, as shown on FIGS. 11-14.

Figure 5:
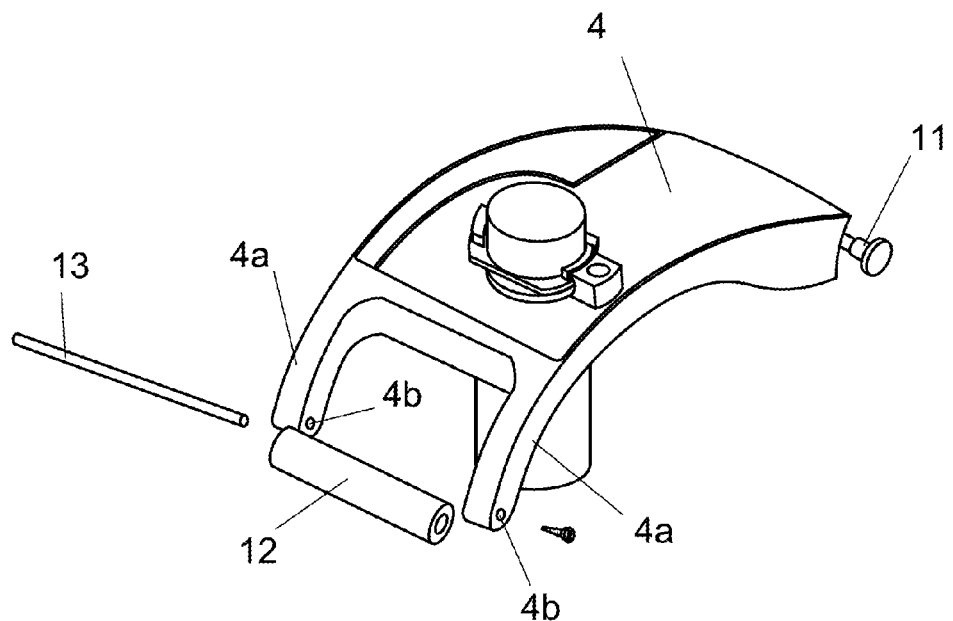
FIGS. 5 and 6 show respective representations of a partially exploded view of the presser and a longitudinal section through the mounting means of the presser handle, respectively.
Figure 6:
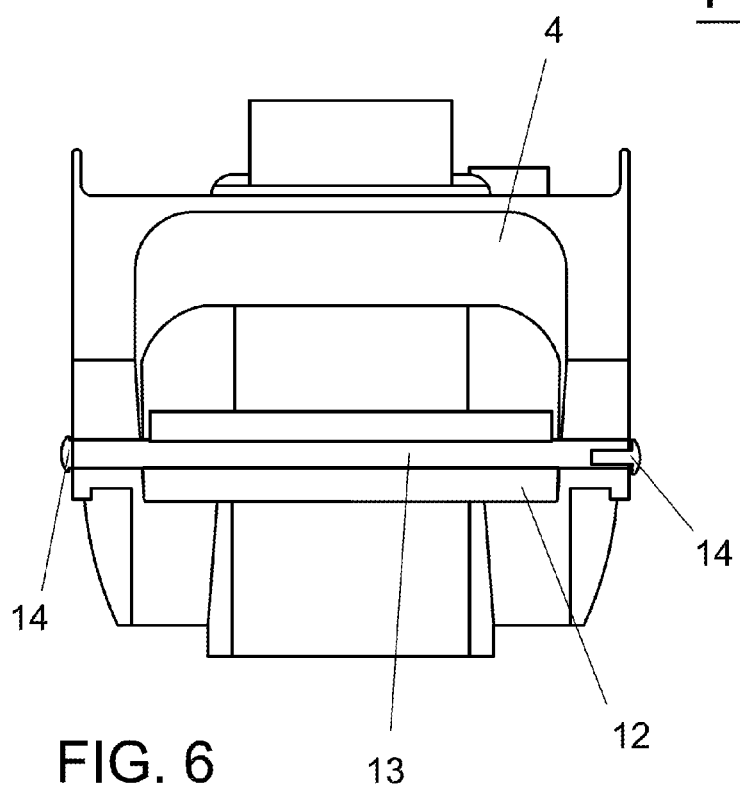

FIGS. 5 and 6 illustrate details of the mounting of the turning handle 12 of presser 4 at the end opposite to the pivoting shaft 11, by means of a partially exploded view and a longitudinal section of the holding handle, respectively. As illustrated in FIG. 5, the turning handle 12 is inserted between two curvilinear arms 4a which are projected in parallel following the longitudinal direction of the presser 4. The handle 12 consists of a cylindrical body provided with an axial through-hole that once aligned with the through-holes 4b made in each one of the arms 4a respectively, admit the insertion of a handle shaft 13 in respect of which the aforesaid handle 12 can turn. The securing of the handle shaft 13 into its operating position is achieved by means of respective stop screws 14 applied to both ends thereof, as is visible from the longitudinal section shown in of FIG. 6. This turning feature of the handle 12 allows the user to maneuver the presser 4 with greater ease, given that the handle 12 at all times follows the user's hand in the different positions that it adopts, without requiring sudden changes or forced and uncomfortable positions for the user.

Similarly, FIGS. 11, 12, 13 and 14 illustrate characteristics of the presser 4; specifically the elements and devices which allow easy dismounting of the presser 4 and its subsequent repositioning in its operating assembly, together with the means for operating the lever incorporated to activate the machine's safety mechanisms.

It is typical for this type of machine to incorporate safety mechanisms that disconnect the power supply to the motor when any part that could represent a potential danger to the user is left open. To this effect, in respect of the presser, there is a lever that through a rod acts on a safety switch, in such a way that it is only possible to feed power to the motor when the presser is in the closed position and the switch is in the safe position. This lever is normally connected to the shaft of the presser, in such a way that the power switch is opened or closed depending on the user's positioning of the presser.

However, in the disclosed machine the presser is dismountable, its pivoting movement being determined by the provision of a removable shaft 11. Due to the fact that it is removable, it is understood that the shaft 11 cannot incorporate a switch activating lever, meaning that it has been necessary to provide other auxiliary means that guarantee the safe activation of the aforesaid power switch, and which are described in relation to FIGS. 12, 13 and 14.

Figure 11:
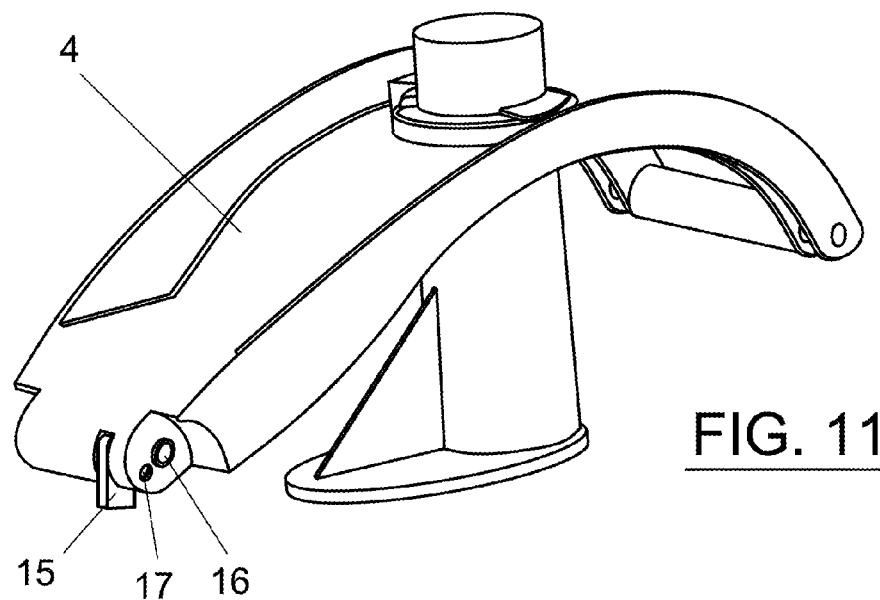
Figure 12:
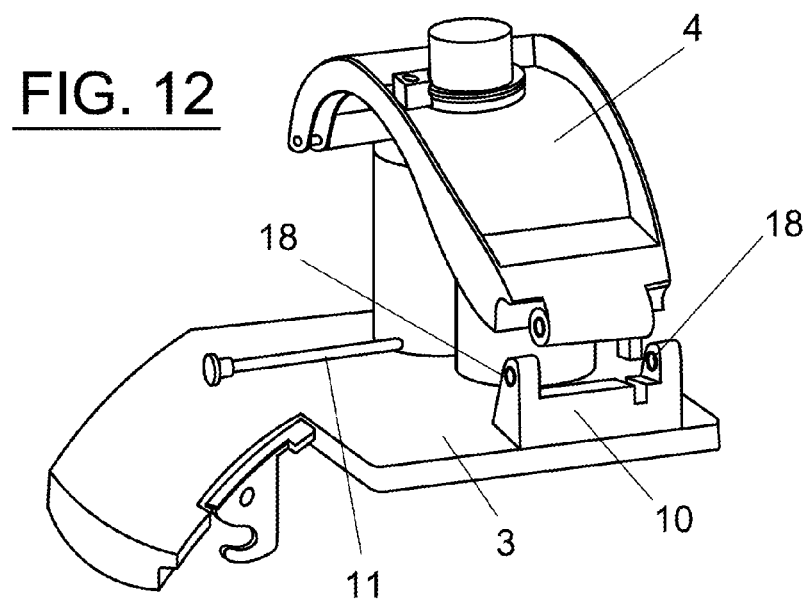

As appears in FIG. 11, a representation of the presser 4 is shown, taken from the folding end thereof. As may be appreciated, it has been contemplated that the activating lever 15 of the power supply mechanism (not shown) is secured to the presser 4 itself, at its pivoting end, with the help of a ferrule 16 inserted in the through-hole of the presser 4 which houses the shaft 11 itself, and securing means 17 that in the represented mode of embodiment is in the form of a screw, but which could consist of any other known means. When the removable shaft 11 is inserted through the respective aligned holes of the machine support 10 and the pivoting end of the presser 4, said shaft 11 similarly passes through the ferrule 16 with the possibility of the latter turning in respect of the former. For effective coupling of the shaft 11, it is contemplated that the support 10 incorporates ferrules 18, as shown in FIG. 12. In the partial section of FIG. 13, the location of the ferrule 18, in respect to the shaft 11, is shown.

The close-up of FIG. 14 illustrates the configuration of the ferrule 18 as the means of interlocking the shaft 11 into position. The ferrule 18 includes a rib 18a in which is an annular projection in the surface of the ferrule 18, and is capable of elastically housing an annular shaft undercut 11a made correspondingly in the aforesaid shaft 11, in a position close to its end. In this way, retaining of the shaft is guaranteed together with the feature that it is removable.

Figure 4:
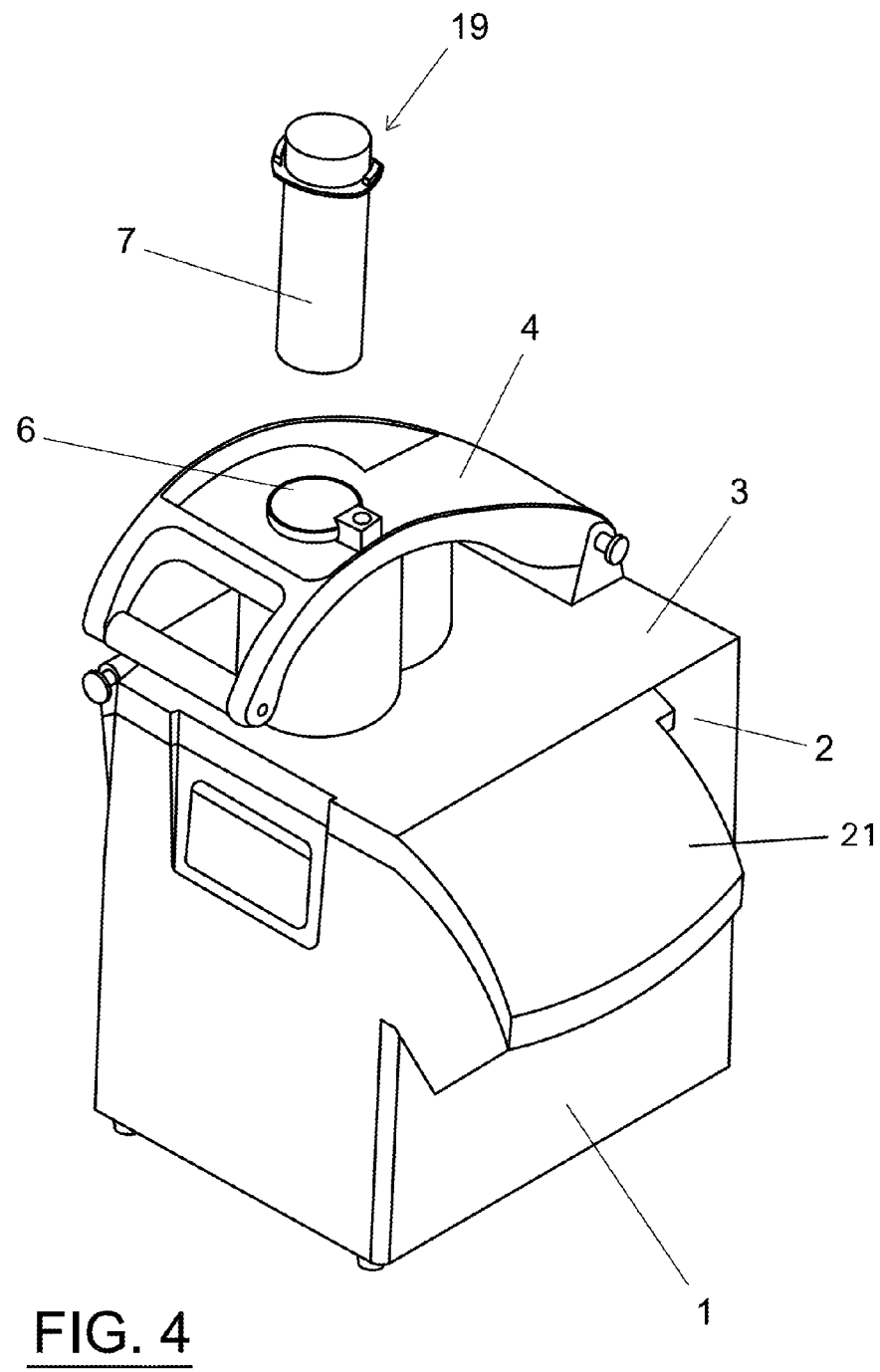
FIG. 4 is a schematic representation, in perspective, of the machine according to the invention with the plunger removed.

FIG. 4 of the drawings shows a schematic view of the disclosed machine with the plunging device 7 removed from inside the cylindrical tube 6 associated with the presser 4. This plunging device 7, is applied by the user to push the food towards the inside of the machine and against the cutting disk 8. The plunger 7 is an element having a generally cylindrical shape, the external diameter of which is sized less than but in accordance with the internal diameter of the cylindrical tube 6 into which it is inserted.

Figure 16:
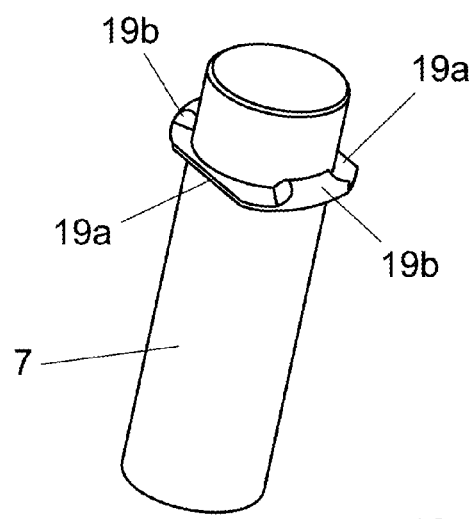
FIG. 16 is a schematic view, in perspective, of a plunger.
Figure 17:
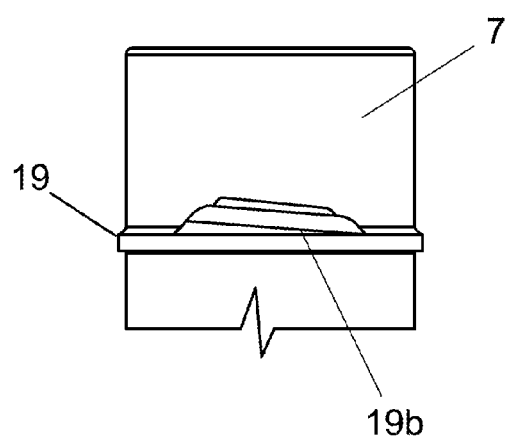
FIG. 17 is a close-up illustrating the stopper tab and securing of the plunger of FIG. 16.

Attached to the plunger 7 is a tab 19 which projects orthogonally outwards from the surface of the cylindrical body of the plunger 7, at a predetermined height. FIGS. 16 and 17 illustrate respectively, a view in perspective of said plunger 7 and a close-up of the top part thereof which allows a better appreciation of the position and shape of the tab 19. According to the representation of FIG. 16, the aforesaid tab 19 is divided into four sections. The two flat sections 19a occupy diametrically opposite positions. The two raised sections 19b, are interspersed with the former and likewise occupy diametrically opposite positions, and follow the general outline of the circumferential profile of the tab 19. The two raised sections 19(b) are made with sloping thicknesses designed to provide a means of securing the position of the plunger 7.

Figure 18:
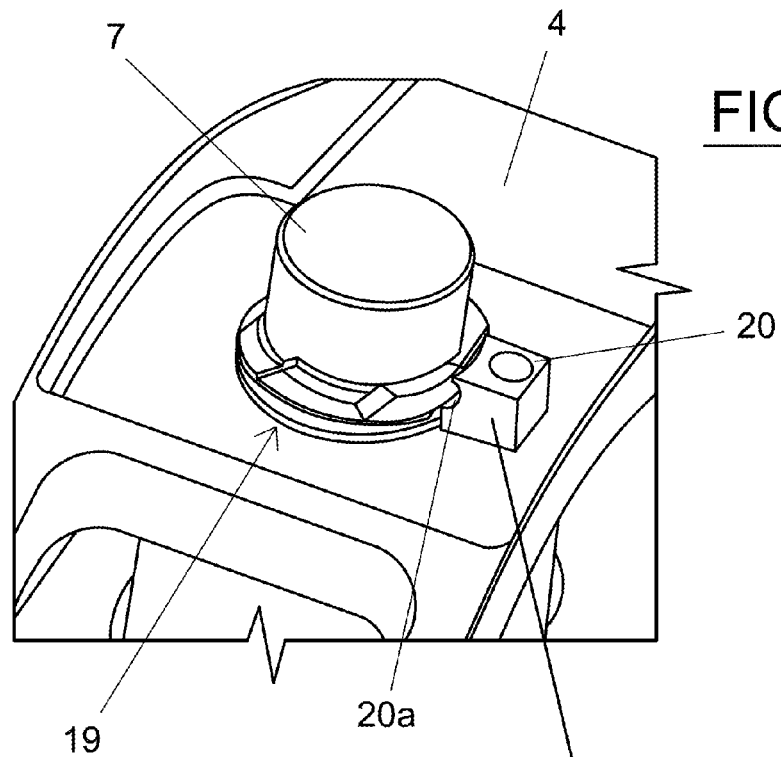
FIG. 18 is a schematic representation, from above, of the functional coupling between the plunger and the cylindrical tube of the presser.
Figure 19:
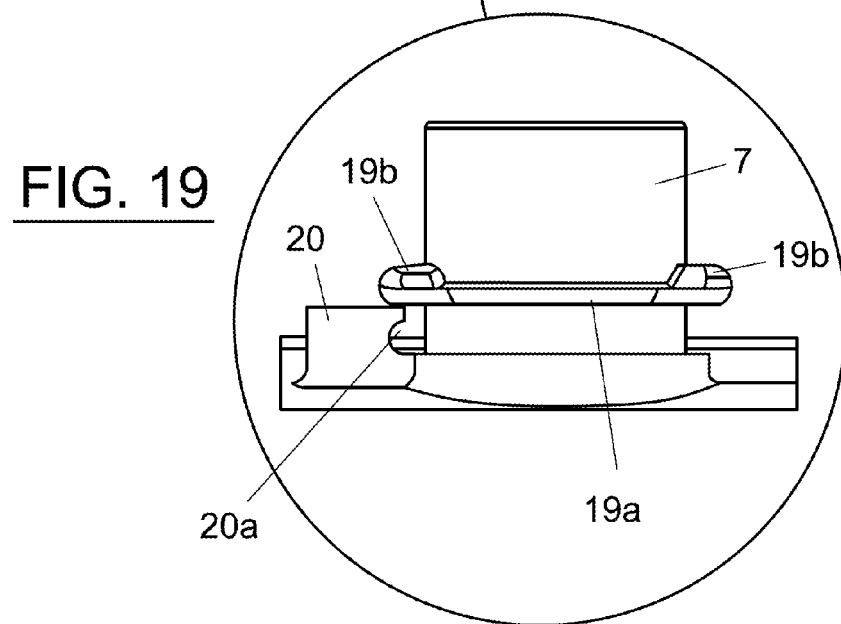
FIG. 19 is a side view of the functional coupling between the plunger and the cylindrical tube of the presser.

FIGS. 18 and 19 illustrate the two possibilities of using the plunger 7. As shown in FIG. 18, the presser 4 includes a fastener 20 attached thereon. The fastener 20 is situated in a position near (approximately tangential to) the mouth 5 which allows the cylindrical tube 6. When the plunger 7 is inserted through the mouth 5, the raised sections 19b of tab 19 are capable of interlocking with said fastener 20. The fastener 20 includes an arched slot 20a made in the side of the fastener adjacent to the plunger 7 and such slot 20a is sized to receive sections 19b.

As may be deduced from the foregoing, it is possible for the user to insert the plunger 7 to varying depths. When the height of the fastener 20 is reached, the tab 19 can hit against the fastener 20 in the event that one of the raised sections 19b coincides with the fastener's position (see FIG. 19), or it may be one of the flat sections 19a that coincides with the position of the fastener 20 (see FIG. 18), in which case the plunger 7 is completely inserted through the cylindrical tube 6. It is then possible for the user to turn the plunger 7 so that the corresponding raised section 19b becomes housed within the arched slot 20a, in the form of bayonet mounting. The plunger 7 is thereby firmly secured in position, without the possibility of vibrations or unwanted movements as occurs in the machines of the current state of the art.

Another important feature of the invention is the inclusion of a blocking device 21 which is formed as part of the food feeder 3 and extends over the food discharge section of the cover of the machine given the folding nature of the former in respect of the latter. This blocking device 21 is located on the side of the machine opposite that of the pivoting shaft 9 of the food feeder 3.

Figure 7:
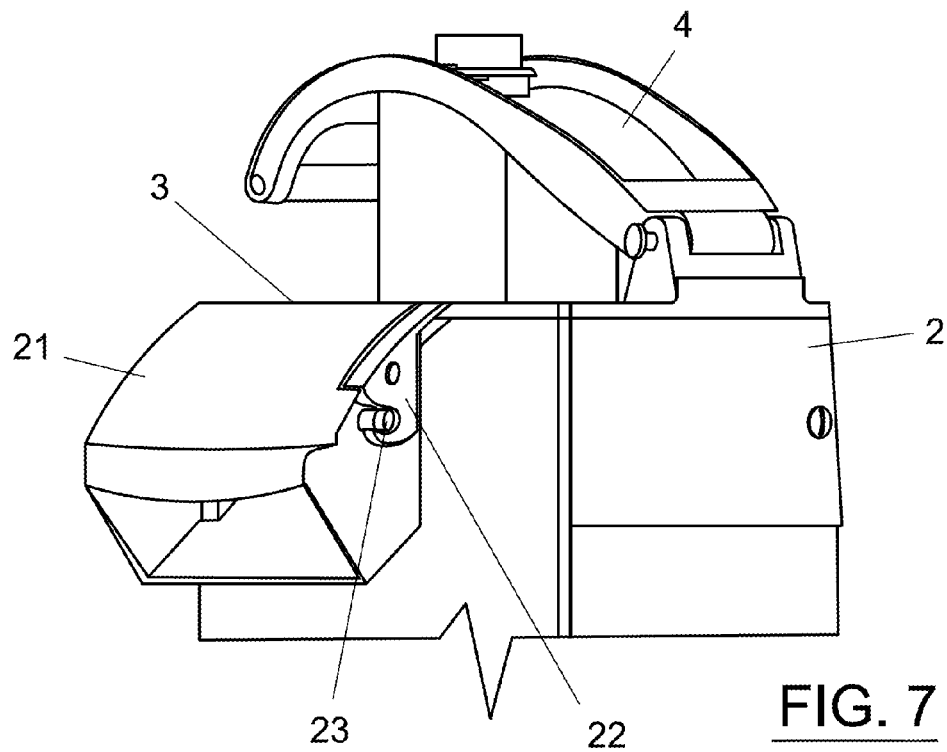
FIGS. 7, 8, 9 and 10 are partial views, in perspective, illustrating the characteristic details of the blocking device between the food feeder and the cover closing the top of the base of the machine.

The blocking device 21 includes a lock piece 22 which is shown in FIG. 7 in a closed operating position, thereby securing the food feeder 3 to the machine cover 2. The lock piece is capable of maintaining two stable positions, closed and open. One end of the lock piece 22 is in the shape of a hook 22a (see FIGS. 7 and 8) for coupling with a pin 23 which is attached to the machine cover 2. The opposite end 22b has a widened part to allow better support of the user's finger. The lock piece 22 includes a transversal hole 22c, in an approximately centred position, through which a fastening screw 24 passes to the blocking device 21 section of the food feeder p3. This allows the user to swing the lock piece 22 to one of the two positions open or closed.

FIG. 7 shows the lock piece 22 in the closed position, with its hook end 22a coupled to the pin 23 for the purposes of preventing the folding or opening of the food feeder part 3. In contrast, FIG. 8 shows the lock piece 22 in the open position turned such that the hook end 22a is uncoupled from the pin 23, enabling the swinging of the food feeder part 3 with respect to the cover 2.

Figure 8:
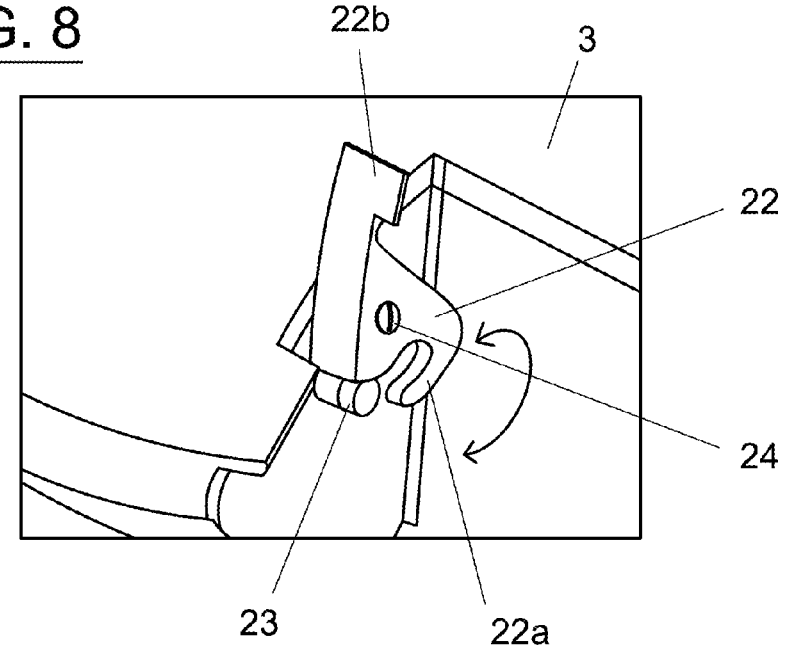
Figure 9:
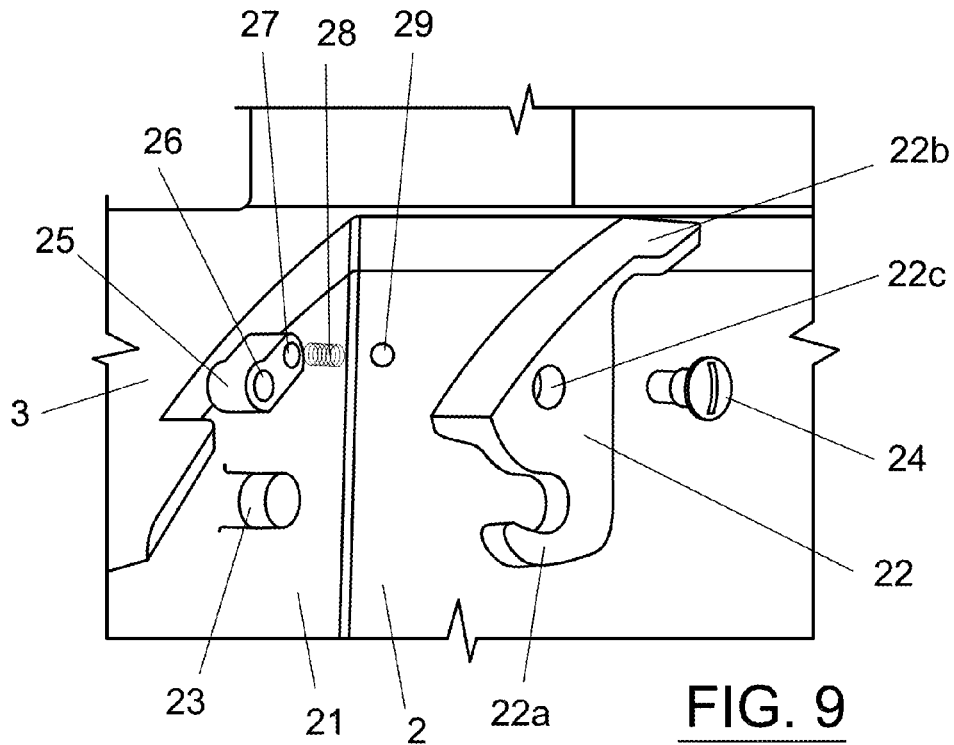

As previously described, the lock piece 22 can adopt two stable positions, namely, a closed position corresponding to the one shown in FIG. 7, wherein the hook end 22a thereof is coupled to the pin 23, and an open position in which the hook end 22a is uncoupled from the pin 23, corresponding to the representation of FIG. 8. However, in the open position, it is desirable for the lock piece 22 to be free of vibrations that cause it to change position, and to this effect, means for the securing thereof in the open position have been provided for, as shown in FIG. 9. With the lock piece 22 removed as shown in FIG. 9, the fastening support 25 that is integral with the food feeder 3 and through hole 26 of which the fastening screw 24 is threaded are visible. In order to provide the desired stabilising means, the fastening support 25 of lock piece 22 is a substantially elongated shape for the purposes of providing a housing 27 capable of holding within it a spring 28 that acts on a ball 29. The lock piece 22 includes, on its internal face, two cavities (not visible in the drawing), capable of partially admitting the ball 29 in a closed position (FIG. 7) and an open position (FIG. 8). In this way, piece 22 can be changed between the open and closed position, both positions being determined by the insertion of the ball 29 in one of the respective internal cavities of lock piece 22. The user does not encounter major resistance in changing the position of piece 22, since all that the user has to do is to overcome the force of the spring 28 to cause the release of the ball 29 from the cavities.

Figure 10:
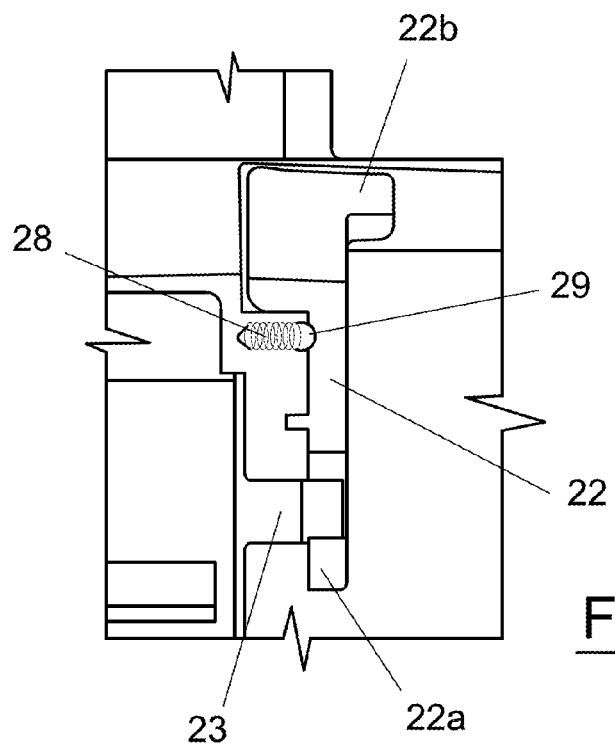

FIG. 10 illustrates a top view of a cross section made through lock piece 22 in the closed position, with the hook end 22a coupled to the pin 23. In this position the ball 29, pushed by the recovery of the spring 28, is partially housed in an approximately semi-spherical cavity made on the internal face of the aforesaid piece 22.

Figure 15:
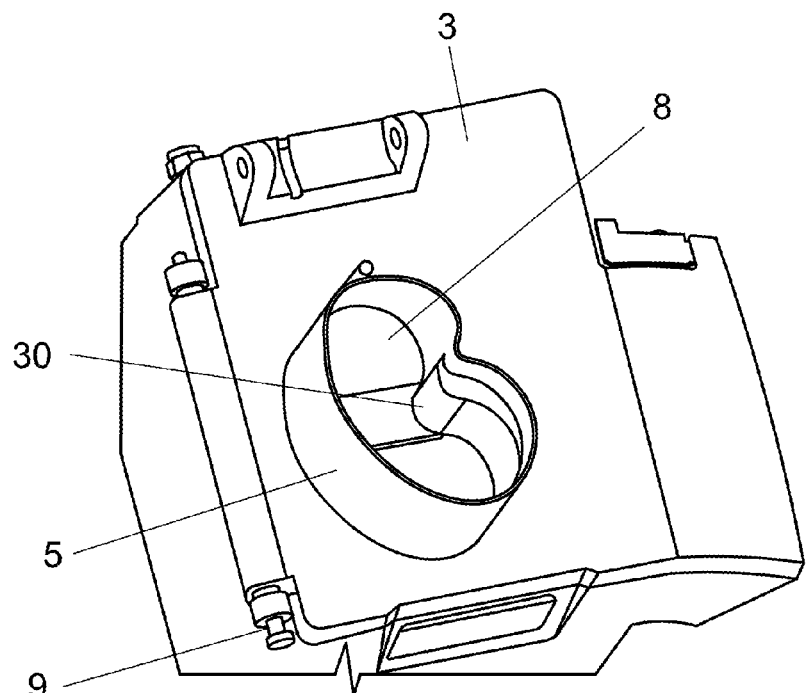
FIG. 15 is a schematic view, from a top perspective, of a food feeder mouth.

Now referring to FIG. 15 of the drawings, a schematic representation is shown in top perspective, of the disclosed cutting machine illustrating the configuration of the mouth 5 of the food feeder 3. As described previously, one of the problems with current machines is that the configuration normally given to this element allows for the possibility that the food introduced will rest on the middle circle of the cutting disk, thereby interfering with the processing of the food. To resolve this problem, the configuration of the mouth 5 is designed in such a way that effective protection is provided for the aforesaid middle circle section. The mouth 5 is configured to include a cylindrical portion 30 designed to be positioned above the middle section of the cutting disk 8. This cylindrical portion 30 extends the height of the mouth 5, guaranteeing that no food is allowed to rest on the middle circle, and is forced through the space swept by the blade of the cutting disk 8.

Figure 20:
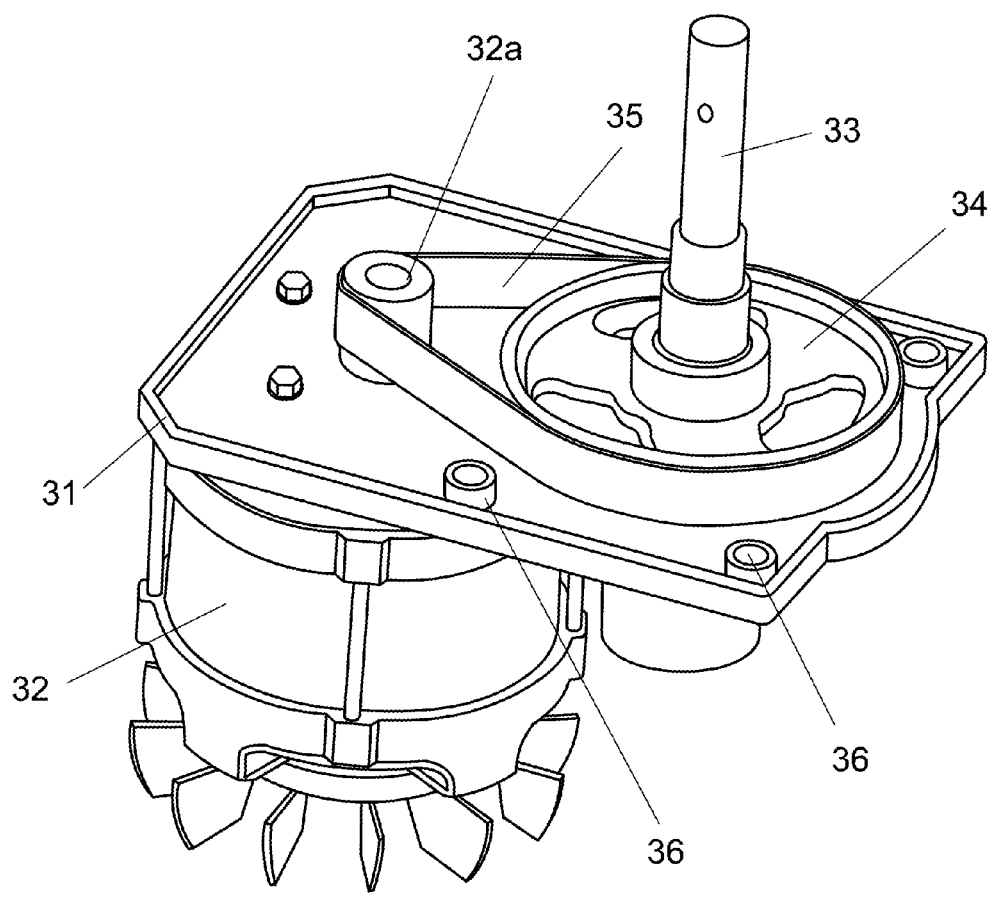
FIG. 20 is a schematic view, in perspective, of the motor support and the motion transmission components.

FIG. 20 shows a schematic representation of a motor support 31 with all the transmission elements incorporated therein. The motor support 31 has a generally flat shape, substantially rectangular, and supports the motor 32 on one side, with the drive shaft 32a protruding on the opposite side. The motor transmission components driven by the motor to rotate the cutting disk are mounted on the side of the motor support on which the motor shaft protrudes. The aforesaid motion transmission components consist of a disk shaft 33 to the end of which the cutting disk 8 is coupled (see FIG. 2), a pulley 34 secured to the disk shaft 33, and a belt 35 of any type, extended between the drive shaft 32a and the pulley 34. The turning motion of the motor is thus transmitted to the pulley 34 and the disk shaft 33 and the cutting disk 8. The assembly of all these drive elements include the bearings, stoppers and securing means necessary in accordance with standard practice.

The motor support 31 includes a number of holes 36 in predetermined positions along its perimeter, for the effective securing of the aforesaid motor support 31 to the internal face of the cover 2 of the machine. The cover includes a through-hole (not shown) for passage of the output shaft 33. Additionally, the coupling between the motor support 31 and the cover 2 is achieved with the help of a gasket to prevent the passage of water or any other type of liquid towards the machine's internal bodies.

It is not considered necessary to lengthen the content of this description for a person skilled in the art to understand its scope and the advantages ensuing from it, as well as to carry out a practical embodiment of its object.

Notwithstanding the foregoing, and given that the description made corresponds solely to an example of a preferred embodiment, it shall be understood that its essence may comprise numerous modifications and variations in detail, similarly contained within the scope of the invention, and which in particular may affect characteristics such as the shape, size or manufacturing materials, or others that do not alter the invention as it has been described and as defined in the following claims.

The invention claimed is:

1. A food cutting machine comprising:
   a base;
   a motor mounted on a motor support and housed in the base;
   motion transmission components;
   a cover attached to a top of the base which houses a cutting disk mounted on a shaft in the motion transmission components;
   a food feeder attached to a top of the cover, wherein the food feeder has a mouth which extends orthogonally from the food feeder;
   a blocking device formed as part of the food feeder and designed to cover a food discharge section of the cover;
   a presser with a curvilinear shape along its longitudinal axis and mounted on a top of the food feeder wherein the presser includes a cylindrical tube configured such that when the machine is in operation, the cylindrical tube is positioned in the mouth of the food feeder; and
   a plunging device designed for insertion through the cylindrical tube on the presser.

2. The food cutting machine of claim 1 wherein the food feeder is connected to the cover by a pivoting, removable shaft.

3. The food cutting machine of claim 2 wherein the presser is attached at one end to the food feeder by means of a pivoting, removable shaft.

4. The food cutting machine of claim 3 wherein a machine support is attached to the outer surface of the food feeder at the pivoting end of the presser; wherein the pivoting end of the presser and the machine support have aligned through-holes, through which the removable shaft is inserted; the through holes of the machine support incorporate ferrules.

5. The food cutting machine of claim 4 where in the ferrule of the machine support through hole at the end opposite where the removable shaft is inserted includes an annular projection in the surface thereof which houses an annular undercut in the removable shaft.

6. The food cutting machine of claim 4 wherein an activating lever is secured to the presser at the pivoting end thereof, wherein said activating lever contains a through hole aligned with the through holes of the presser and machine support to allow the removable shaft.

7. The food cutting machine of claim 3 wherein the end of the presser opposite the end attached to the food feeder is a turning handle capable of rotating along its longitudinal axis.

8. The food cutting machine of claim 7 wherein the mouth part is of a semi-cylindrical shape and is positioned over the turning axis and is sized such that it envelopes the turning axis.

9. The food cutting machine of claim 8 wherein the presser and the plunging device are capable of being mechanically interlocked.

10. The food cutting machine of claim 9 wherein a tab with a sloped thickness protrudes orthogonally from the outer surface of the plunging device and a fastener is positioned near the mouth, wherein said fastener has a slot sized to receive the tab of the plunger in a bayonet mounting type of configuration.

11. The food cutting machine of claim 9 wherein the blocking device consists of a lock piece attached to the food feeder, wherein one end of the lock piece is in the shape of a hook, and said hook couples with a pin attached to the cover.

12. The food cutting machine of claim 11 wherein there is a fastening support secured to the food feeder and aligned with the lock piece; wherein said fastening support has a cavity which houses a spring that acts on a ball and wherein the lock piece has on its internal face two cavities sized to partially admit said ball, wherein the position of the cavities in the lock piece corresponds to the locked and unlocked positions of the lock piece.

13. The food cutting machine of claim 1 wherein the motion transmission components and the motor are mounted on opposite sides of the motor support.

\* \* \* \* \*